Patented Dec. 29, 1936

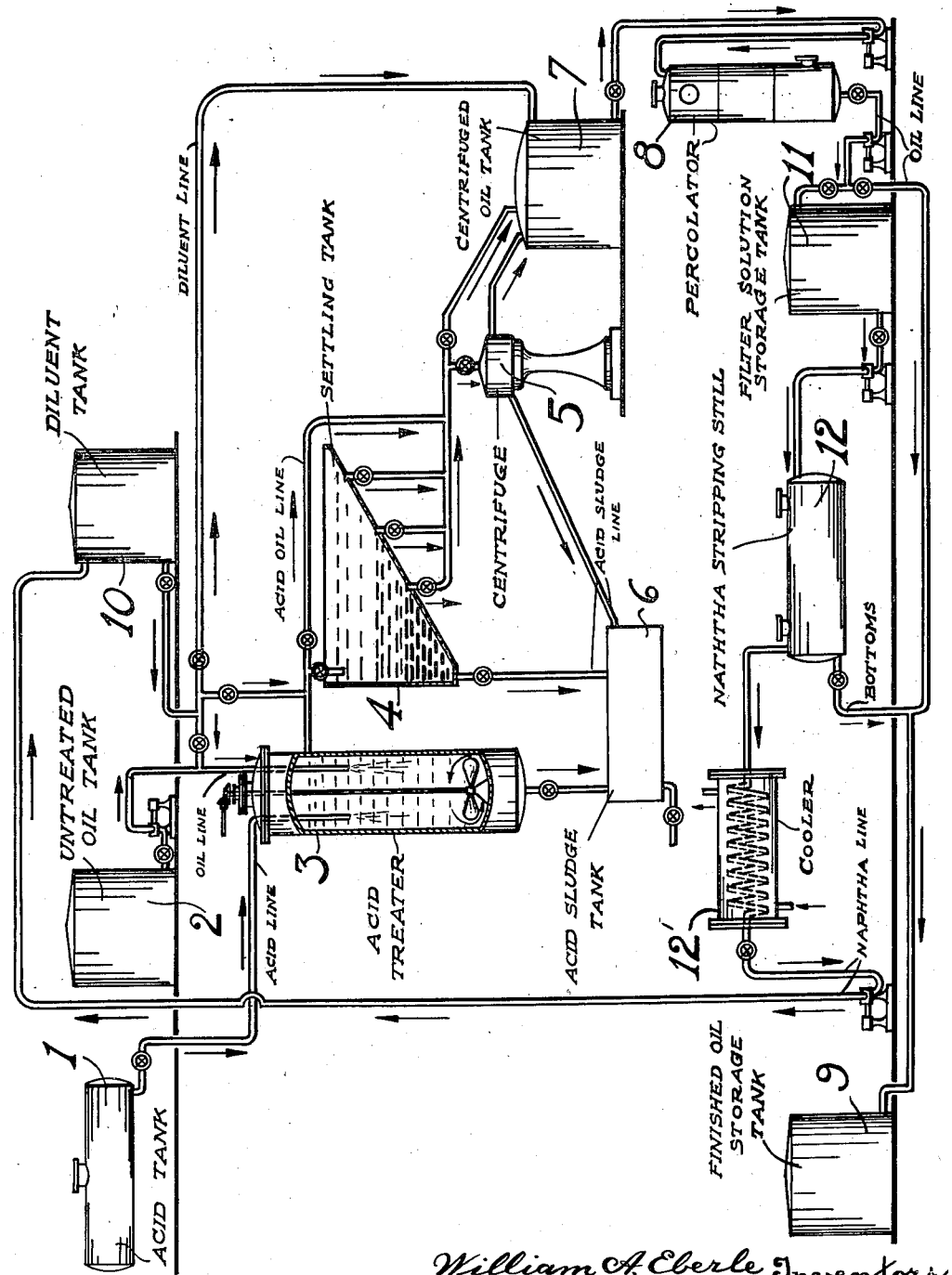

2,066,200

UNITED STATES PATENT OFFICE 2,066,200

PROCESS OF DECOLORIZING A LUBRICATING OIL STOCK

William A. Eberle, Jersey City, and Marion B. Hopkins, Elizabeth, N. J., assignors to Standard Oil Development Company, a corporation of Delaware Application April 21, 1934, Serial No. 721,662

1 Claim. (Cl. 196—40)

This invention relates to a method of finishing lubricating oil stocks and, more especially, to a method of decolorizing oils and it will be understood from the following description when read in conjunction with the drawing, the sole figure of which is a diagrammatic side elevation partly in section of an apparatus appropriate for carrying out the invention.

We have discovered that the clay filtration of lubricating oil stocks produced by overhead distillation can be carried out with great advantage and very good filtration yield, if the stock is submitted to a certain preliminary treatment, as will be described in the following:

According to our invention, the lubricating oil stock originally produced as overhead product in the distillation of a crude oil is acidified with a comparatively small amount of sulfuric acid. This amount should not exceed 4 lbs. of 66° Baumé sulfuric acid per 50 gallon barrel of lubricating stock and mainly serves for agglomerating a part of the coloring materials present in the stock. The acid sludge is separated from the treated oil by some method involving difference in density, such as settling or centrifuging. If necessary, the viscosity of the lubricating stock may be reduced by dilution with gasoline or kerosene or, in general, petroleum naphtha either before or right after the acid treat, in order to ensure rapid removal of the sludge. Enough of the diluent is used to reduce the viscosity of the oil to below 300 seconds Saybolt at 100° F. The dilution is mainly desirable in case the sludge is removed by settling. In the preferred form of our invention, however, the sludge is removed by centrifuging either directly after the acid treating or after a preliminary settling. In the latter case part of the sludge is separated during the preliminary settling and the oil containing some further amount of sludge is then submitted to centrifuging for the separation thereof. Our preferred method includes the separation of sludge by means of centrifuging.

The oil obtained after the separation of the sludge by means of settling or centrifuging or both should not contain more than an acidity corresponding to 1 mg. KOH per gm. of oil. This acidity is mostly due to the finely divided sludge which remains dissolved in the oil. The acid oil then is submitted to filtration by means of percolation through a layer of coarse adsorbent clay, such as fuller's earth. The oil is submitted to no other treatment such as water wash or neutralization with alkali between the acid treat and the percolation. We have found that exceptionally high filter yields are obtained if the oil to be filtered has been submitted to the preliminary treatment described above and if the filtration is carried out in a slightly acid condition without, however, permitting an acidity corresponding to higher than 1 mg. KOH per gram of oil in the oil to be filtered.

Referring now to the drawing, the same will be described in conjunction with the method of operation. Acid from tank 1 and untreated oil from tank 2 are passed into the acid treater 3 which is provided with an agitator. After the treatment the acid oil is drawn off either to the settling tank 4 or directly to the centrifuge 5, while the acid sludge is removed into the tank 6. From the centrifuge the clear oil is drawn off into a storage tank 7 for the centrifuged oil, from which it is passed through the percolator 8 and is finally stored in finished oil storage tank 9. When a diluent is used in the process the same is taken from the storage tank 10 and is added to the oil, either before the acid treat or between the acid treat and settling and/or centrifuging, or it may be added to the centrifuged oil in tank 7, as shown in the drawing. The oil from filter 8 is transferred in this case to the filter solution storage tank 11, from which it passes into the naphtha stripping still 12, the bottoms from the still being removed into the finished oil storage tank 9 and the overhead naphtha vapors returned through a condenser into the diluent tank 10. The various lines shown in the drawing also permit the by-passing of either the settling tank or the centrifuge. The acid treating is carried out in the usual manner by means of agitating the acid with the oil; 66° Baumé acid is usually used although other strengths may also be applied. The filtration is carried out by percolating the oil through a bed of coarse adsorbent clay. The temperature at which the oil is held during the percolation is usually from 50° F. to 130° F. After the percolation the lubricating oil is obtained in a finished form and usually no further treatment is necessary.

The following examples serve to illustrate our process:

A Manchester spindle stock of 150 to 160 seconds Saybolt viscosity at 100° F. was treated with 2 lbs. of 66° Baumé sulfuric acid per 50 gallon barrel at about 70° F. After thorough agitation the oil passed through a preliminary settling tank where part of the sludge was removed and the remaining oil was sent through a centrifugal machine where substantially all the remaining sludge was removed. The acidity of the oil on leaving the centrifuge was 0.32 mg. KOH per gram of oil. The acid oil was then percolated at 90° F. through a 22 ton filter of clay from which a yield of 2,450 barrels of oil of perfect emulsion test was obtained, having a color of 11 Robinson. Another experiment was run for comparison with an untreated Manchester stock which was filtered to the same color but yielded only 500 barrels per 22 ton filter.

In another series of experiments the same spindle stock was treated with the same amount of acid at the same temperature but the sludge was separated by settling instead of centrifuging. The acidity before filtration was controlled to 0.5 mg. KOH per gram of oil and the yield of finished oil of perfect emulsion test and 11 Robinson color ranged between 1200 and 2000 barrels per 22 ton filter, depending upon the length of time the acid oil was in storage prior to percolation. Shorter storage times give a higher percolation yield. The percolation was again carried out at 90° F.

Our invention may be modified in different ways and, therefore, it is not to be limited by the examples given for illustration but only by the following claim in which it is our intention to claim all novelty inherent in the invention.

What we claim is:

Process of decolorizing a lubricating oil stock distillate which consists in agitating the stock with sulfuric acid in an amount not substantially exceeding 4 lbs. of 66° Baumé acid per barrel of stock, removing the major portion of the sludge formed by difference in density until the acidity of the stock reaches a value between neutrality and an acidity corresponding to about 1 mg. KOH per gram of stock, and percolating the stock through a layer of coarse clay in an amount greatly in excess of that required to neutralize the acidity of the stock and sufficient to impart to the stock its final desired color.

WILLIAM A. EBERLE.
MARION B. HOPKINS.